United States Patent
Varanasi

(10) Patent No.: US 6,191,059 B1
(45) Date of Patent: Feb. 20, 2001

(54) METAL SILICIDES AS PERFORMANCE MODIFIERS FOR GLASS COMPOSITIONS

(75) Inventor: Srikanth Varanasi, Toledo, OH (US)

(73) Assignee: Libbey-Owens-Ford Co., Toledo, OH (US)

( * ) Notice: Under 35 U.S.C. 154(b), the term of this patent shall be extended for 0 days.

(21) Appl. No.: 09/223,344

(22) Filed: Dec. 30, 1998

(51) Int. Cl.$^7$ .................................................. C03C 3/087
(52) U.S. Cl. .............................. 501/70; 501/71; 428/426; 428/428
(58) Field of Search .................................. 501/27, 28, 29, 501/30, 31, 70, 71; 428/426, 428

(56) References Cited

U.S. PATENT DOCUMENTS 3,773,530 * 11/1973 Morgan .................................. 501/30
4,039,997 * 8/1977 Huang et al. ........................ 252/520
4,792,536 * 12/1988 Pecoraro et al. ....................... 501/70

FOREIGN PATENT DOCUMENTS

2345284 * 7/2000 (GB) .

* cited by examiner

*Primary Examiner*—Karl Group
(74) *Attorney, Agent, or Firm*—Marshall & Melhorn

(57) ABSTRACT

Silicate based glass compositions with metal silicide compounds included in the composition as performance modifiers to impart desirable color and improved energy absorbance properties. The metal silicides are added to the batch glass composition in amounts greater than 0.05 weight percent prior to melting. The composition and method result in a finished glass suitable for use in architectural and automotive glazings.

26 Claims, No Drawings

METAL SILICIDES AS PERFORMANCE MODIFIERS FOR GLASS COMPOSITIONS

BACKGROUND OF THE INVENTION

1. Field of the Invention

The present invention is directed to performance modifiers for silicate based glass compositions, more particularly to metal silicides as performance modifiers for silicate based glass compositions, and even more particularly to metal silicides in silicate based glass compositions for the improvement of properties such as the absorption of infrared energy or the transmittance of color. The present invention is also directed to both a method of producing a glass composition and the finished glass composition resulting from the admixing, heating, and melting of a metal silicide in the batch glass composition.

2. Background of the Invention

Base glass compositions generally include one primary ion as a network former. A network former is the primary cation in the glass composition that bonds with oxygen to create an amorphous network. Other cations may also be present in the amorphous network. However, a primary cation is generally considered one which is present in an amount of about 25 weight percent or greater in the glass composition. Silicon is one cation which serves as a network former to provide silicate based glasses. The silicon is generally added to a batch glass composition as silica ($SiO_2$).

Performance modifiers are often added to a base glass composition to impart specific color and energy absorbance properties in the finished glass. The absorption of energy at specific wavelengths is often desirable to enable various uses for the glass compositions. Additionally, certain colors are preferred for various glasses for aesthetic reasons.

There are limitations within specific glasses that must be balanced or optimized when attempting to achieve desired color and energy transmittance properties. For example, certain ingredients may improve the absorption of near infrared energy while imparting an undesirable color or reducing the light transmittance. Thus, the optimization of a specific color or energy transmittance property often negatively impacts other desirable transmittance properties.

The glass industry is continuously seeking ways to improve solar attenuation properties in glass and thereby to improve the efficiency, and expand the use, of the resulting glass articles. Infrared absorbing, or heat reducing, silicate glasses are recognized within the art. In general, infrared absorbing silicate glasses involve the addition of specific colorants that impact the color and energy transmittance properties of the glass.

One method generally recognized for manufacturing heat or infrared radiation absorbing silicate glass is through the incorporation therein of iron. The iron is generally present in the glass as both ferrous oxide (FeO) and ferric oxide ($Fe_2O_3$). The balance between ferrous and ferric oxide has a direct and material effect on the color and transmittance properties of the glass. As the ferrous oxide content is increased (as a result of chemically reducing ferric oxide), the infrared absorption increases and the ultraviolet absorption decreases. The shift toward a higher concentration of FeO in relation to the $Fe_2O_3$ causes a change in the color of the glass from a yellow-green to a blue-green, which reduces the visible transmittance of the glass.

Thus, it is desirable in the glass industry to provide additional performance modifiers that provide a high degree of selectivity between the visible region and the infrared region of the spectrum. Selectivity is generally referred to as the difference between the transmittance of visible light and the attenuation of infrared energy. Additionally, it is important to balance a high degree of selectivity in the finished glass composition with a desired color.

SUMMARY OF THE INVENTION

According to the present invention, there is provided a metal silicide compound suitable for use in a silicate batch glass composition as a performance modifier to impart desirable color or improve energy absorbance properties over conventional silicate glasses.

The metal silicide compound is added to the batch glass composition prior to melting. The present invention also includes a process for melting the glass batch composition and the articles produced therefrom. The utilization of a metal silicide results in the unexpected improvement of color or energy absorbance properties when added to conventional silicate based glass compositions.

The glasses produced in accordance with the present invention may have various different colors and optical properties. The metal silicide is utilized to produce glasses with a visible light transmittance (IllA) of 10% or greater, depending upon additional colorants utilized in the glass batch composition. Additionally, specific applications may require the use of the metal silicide in glasses needing a high degree of selectivity. For example, the performance modifiers of the present invention enable the production of a silicate glass composition having a visible light transmittance in excess of 70% with a high degree of absorption of near infrared energy.

The preferred metal silicides suitable for use in the present invention are selected from the group consisting of lithium silicide, sodium silicide, potassium silicide, rubidium silicide, cesium silicide, lanthanum silicide, magnesium silicide, calcium silicide, strontium silicide, barium silicide, cerium silicide, thorium silicide, scandium silicide, yttrium silicide, titanium silicide, vanadium silicide, chromium silicide, manganese silicide, iron silicide, cobalt silicide, nickel silicide, copper silicide, zirconium silicide, niobium silicide, molybdenum silicide, ruthenium silicide, rhodium silicide, palladium silicide, hafnium silicide, tantalum silicide, tungsten silicide, rhenium silicide, osmium silicide, iridium silicide, platinum silicide, praseodymium silicide, neodymium silicide, samarium silicide, europium silicide, gadolinium silicide, terbium silicide, dysprosium silicide, holmium silicide, erbium silicide, thulium silicide, ytterbium silicide, lutetium silicide, uranium silicide, neptunium silicide, plutonium silicide, and combinations thereof.

Each of the metal suicides may impart different characteristics to the finished silicate glass. Therefore, the selection of the metal silicide is dependent upon the desired color and energy absorbance properties of the finished glass as well as the base glass composition and other colorants included in the base glass composition. Additionally, several of the noted performance modifiers may be utilized in combination in the glass batch composition.

In accordance with the present invention, the most preferred silicides include iron silicide, titanium silicide, and molybdenum silicide. A finished silicate glass containing iron, and produced with the preferred silicide compounds, can exhibit improved absorption of near infrared energy over iron containing glasses without the noted metal silicides.

It would be an advantage to provide a performance modifier for use in silicate batch glass compositions that significantly improves either the color or energy absorbance properties of the finished glass composition. The metal silicide of the present invention is a suitable performance modifier that is capable if improving the energy absorbance of the glass over conventional silicate glasses. Additionally, the metal silicide of the present invention is capable of achieving a high degree of selectivity.

It would be an additional advantage to provide a performance modifier that is suitable for use in batch glass compositions in a float glass production process.

DETAILED DESCRIPTION

In accordance with the present invention, it has been discovered that a metal silicide compound may be included in a silicate based batch glass composition as a performance modifier to improve color or energy absorbance properties of the finished glass. The metal silicide compound is added to conventional silicate glass compositions. It is desirable to improve solar attenuation properties in glass to improve the efficiency and expand the use of the resulting glass articles. In addition to the solar attenuation properties, specific colors are often desired in finished glass compositions. The metal silicide of the present invention can significantly impact one or both of the color and solar attenuation properties of the finished silicate glass.

The present invention is suitable for use in silicate glasses. Silicate glasses are generally glasses which utilize silicon as the network former. The network former is the primary cation which bonds with oxygen to create the amorphous network. In general, silicate glasses are glasses having over 25 mole % silica ($SiO_2$) in the composition. Thus, silicate glasses can include other cations in the glass composition, such as aluminum, sodium, calcium, magnesium, phosphorus, and boron. Silicate glasses are preferred because their physical properties enable the production of the glass in a float glass production process.

A preferred silicate glass is a soda-lime-silica composition. The composition of soda-lime-silica glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |
| $Ga_2O_3$ | 0–5 |

Other minor ingredients, including melting and refining aids such as sulfur compounds (measured as $SO_3$), may also appear in the glass composition at levels less than one weight percent without affecting the properties of the finished glass composition. Suitable raw material for producing a soda-lime-silica glass include, sand, limestone, dolomite, soda ash, salt cake or gypsum, niter, iron oxide, and carbon.

The silicate based glass compositions to which the metal silicides of the present invention are added may include conventional colorants. In addition to coloring the glass, the colorants may also impart certain energy attenuation properties such as the absorption of infrared and ultraviolet radiation. The metal silicides of the present invention, when included with known colorants, can affect either the color or energy absorption properties beyond anticipated effects generally recognized with the colorants alone.

In a preferred embodiment, the metal silicide of the present invention is admixed, heated, and melted in the glass batch composition along with an amount of iron. The colorant iron is known to impart specific color and energy absorbance properties to the finished glass. The combination of iron and a metal silicide can improve the energy absorbance properties in the finished glass over those generally obtained with iron alone. The source of iron in the glass batch composition can originate from either iron containing colorants, iron silicides, or both.

One or more of the metal silicides are added to the silicate batch glass composition with the other batch ingredients. The metal silicides are generally added to the batch composition in amounts of about 0.05 weight percent or more. Preferably, the metal silicides are added in the range of about 0.05 weight percent to about 4.0 weight percent.

All metal silicides may be suitable for use in glass batch compositions. The preferred metal silicides are selected from the group consisting of lithium silicide, sodium silicide, potassium silicide, rubidium silicide, cesium silicide, lanthanum silicide, magnesium silicide, calcium silicide, strontium silicide, barium silicide, cerium suicide, thorium silicide, scandium silicide, yttrium silicide, titanium silicide, vanadium silicide, chromium silicide, manganese silicide, iron silicide, cobalt silicide, nickel silicide, copper silicide, zirconium silicide, niobium silicide, molybdenum silicide, ruthenium silicide, rhodium silicide, palladium silicide, hafnium silicide, tantalum silicide, tungsten silicide, rhenium silicide, osmium silicide, iridium silicide, platinum silicide, praseodymium silicide, neodymium silicide, samarium silicide, europium silicide, gadolinium silicide, terbium silicide, dysprosium silicide, holmium silicide, erbium silicide, thulium silicide, ytterbium silicide, lutetium silicide, uranium silicide, neptunium silicide, plutonium silicide, and combinations thereof. The most preferred silicides include those selected from the group consisting of iron silicide, titanium silicide, and molybdenum silicide. Depending upon the specific metal, the metal silicide may be present in various stoichiometric formulas. The suicides are added to the silicate batch glass composition prior to melting.

Different metal silicides affect the finished glass composition in different ways. For example, the most preferred iron, titanium, and molybdenum silicides, when included with a conventional glass containing an amount of iron, are capable of impacting the absorbance of near infrared energy of the glass. The iron in the glass batch composition may originate from the silicide or from other conventional sources. The iron is generally included in an amount in the batch glass composition so as to result in about 0.1 weight percent to about 4.5 weight percent total iron in the finished glass. Additionally, titanium and molybdenum silicides can improve the absorption of ultraviolet radiation in the finished glass composition.

Iron silicide, or other metal silicides with conventional sources of iron, are capable of producing a glass that has an Illuminant A visible light transmittance of greater than 70% and a direct solar heat transmittance of less than 43%, and preferably less than 41%, at a nominal 3–6 mm thickness. This is a significant improvement over conventional heat absorbing glasses which have a visible light transmittance of greater than 70% and direct solar heat transmittance value of just less than 46%. Additionally, the batch composition may be adjusted to achieve a visible light transmittance of 75% and a direct solar heat transmittance of less than 47% for specific applications.

Alternatively, the metal silicides of the present invention may be combined with other glass modifiers to achieve a high degree of selectivity. For example, the metal silicides may added with one or more compounds selected from the group consisting of metal phosphides, metal borides, and metal nitrides to achieve advantageous levels of absorption of infrared energy without adversely affected the visible light transmittance or the color of the finished glass. The metal phosphides, metal borides, and metal nitrides are preferably included at levels up to about 1.5 weight percent in the batch glass composition.

The metal silicides included in the silicate glass batch composition are admixed, heated, and melted to form the finished glass. Conventional glass batch mixing devices are utilized in compounding the ingredients. The batch materials are melted together in a conventional glass making furnace, to form a silicate glass composition, which thereafter may be continuously cast onto the molten metal bath in a float glass production process.

The resulting finished glass may have various colors and energy transmittance properties depending upon the other components and colorants utilized in the glass batch composition. The finished glass will generally have a visible light transmittance (ILLA) of greater than 10%. Select light transmittance ranges may be obtained by varying specific colorants. For example, the metal silicides may be utilized to produce automotive glazings. The present invention could be combined with iron in a soda-lime-silica glass to produce a glazing unit wherein two sheets of glass, at a thickness in the range of about 1.7 mm to about 2.5 mm, are adhered together through a layer of interposed resinous material to form an automotive windshield. The present invention is also suitable for producing other automotive and architectural glazings.

The following Examples in Table I illustrate glass compositions in accordance with the invention that are readily formed into glass articles or glazings. Each Example includes a soda-lime-silica base glass composition prepared in accordance with the present invention. The specific performance modifier and colorant compositions are noted for each Example.

The Examples were prepared by weighing the noted ingredients, colorants, and performance modifiers on a Mettler balance. The colorants and performance modifiers were added to a conventional base glass batch composition including sand, dolomite, limestone, soda ash, saltcake, and gypsum. The ingredients were placed in a high temperature crucible and thoroughly mixed to provide a homogeneous mixture. The crucibles were then placed in a gas-fired furnace. The temperature of the furnace was slowly ramped to 2600° F. and held at that temperature for over four hours. During the high temperature holding step, the crucibles were removed after two and one half hours and the melt was stirred. The crucibles were then placed back into the furnace for the remaining one and one half hours. Upon completion of the melting phase, the crucibles were removed from the furnace. The molten samples were poured into a 2"×4" graphite mold to form glass slabs. The slabs were immediately transferred to an annealer operating at 1150° F. and held for one to two hours. The slabs were then cooled overnight in the annealer.

The transmittance values for each of the slabs were measured on a Perkin Elmer Lambda 19 Spectrophotometer. The performance data was collected and then utilized to calculate the optical values for Illuminant A (Ill A), direct solar heat transmittance (DSHT), Illuminant C (Ill C), ultraviolet radiation transmittance (Tuv), and CIE Illuminant C two degree observer color scale coordinates (L*, a*, and b*). The optical values were calculated in accordance with the ASTM E 308-90 test method for computing the colors of objects by using the CIE system and Parry Moon air mass 2.0 solar energy distribution curve.

Comparative Examples 1, 2, and 14 are also included in Table I. Examples 1 and 2 are two different standard blue glass compositions. Example 14 represents a standard heat absorbing green glass composition.

The Examples illustrate but do not limit the invention. In the Examples, all parts and percentages are by weight and:

(a) $Fe_2O_3$, $TiO_2$, $M_xSi_y$, $Fe_xB_y$, $Fe_2P$, $Fe_xN_y$, and Total $Fe_2O_3$ are expressed in percent;

(b) total iron is expressed as if all iron present were present as ferric oxide; and (c) The transmittance data for the Examples is based on the nominal glass thickness specified in Table 1.

TABLE 1

| Ex | Color | Fe2O3 (wt %) | MxSly (wt %) | FexBy (wt %) | Fe2P (wt %) | FexNy (wt %) | Tot Fe2O3 (wt %) | TiO2 (wt %) | Other (ppm) |
|---|---|---|---|---|---|---|---|---|---|
| All @ 5.6 mm thickness | | | | | | | | | |
| 1 | blue | 0.6 | | | | | 0.6 | 0.1 | 65 Co3O4 |
| 2 | blue | 0.479 | | | | | 0.479 | | |
| 3 | blue | 0.734 | 0.12(FeSi) | | | | 0.84 | | |
| 4 | blue | 0.619 | 0.175(FeSi) | | | | 0.778 | | |
| 5 | blue | 0.734 | 0.075(FeSi) | | | | 0.81 | | |
| 6 | blue | | 0.25(FeSi) | 0.25(FeB) | | | 0.552 | | |
| 7 | bronze | | 0.25(FeSi) | | 0.25(FeP) | | 0.523 | | |
| 8 | blue | | 0.25(FeSi) | | | 0.25(FexN) | 0.557 | | |
| 9 | blue | 0.5 | 0.075(CoSi) | | | | 0.5 | | |
| 10 | bronze | 0.5 | 0.075(NiSi) | | | | 0.5 | | |
| 11 | blue | 0.5 | 0.075(NbSi) | | | | 0.5 | | |
| 12 | bronze | 0.734 | 0.075(NiSi) | | | | 0.734 | | |
| 13 | green | 0.734 | 0.075(NbSi) | | | | 0.734 | | |
| All @ 4.0 mm thickness | | | | | | | | | |
| 14 | green | 0.8 | | | | | 0.8 | 0.4 | |
| 15 | green | 0.672 | 0.12(FeSi) | | | | 0.8 | 0.5 | |

TABLE 1-continued

| | | | | | | | | |
|---|---|---|---|---|---|---|---|---|
| 16 | green | 0.627 | 0.175(FeSi) | | | | 0.75 | 0.5 |
| 17 | green | 0.678 | 0.12(FeSi) | | | | 0.8 | 1.1 |
| 18 | green | 0.627 | 0.175(FeSi) | | | | 0.75 | 1.1 |
| 19 | green | | 0.25(FeSi) | | | 0.25(FexN) | 0.675 | 0.5 |
| 20 | green | | 0.25(FeSi) | | | 0.25(FexN) | 0.675 | 1.1 |
| 21 | green | | 0.25(FeSi) | 0.25(FeB) | | | 0.65 | 0.5 |
| 22 | green | | 0.25(FeSi) | 0.25(FeB)) | | | 0.65 | 1.1 |

| Ex | ILLA | DSHT | ILLC | Tuv | L* | a* | b* |
|---|---|---|---|---|---|---|---|
| | All @ 5.6 mm thickness | | | | | | |
| 1 | 55.1 | 35.3 | 57.8 | 39.1 | 80.6 | −8.8 | −11.7 |
| 2 | 68.3 | 36.9 | 71.7 | 46.2 | 87.8 | −11.4 | −7.4 |
| 3 | 61.8 | 31.1 | 64.6 | 34.3 | 84.3 | −13.1 | −2.5 |
| 4 | 63.3 | 32.3 | 66.2 | 38.2 | 85.1 | −16.7 | −3.4 |
| 5 | 68.2 | 38.4 | 70.5 | 37.8 | 87.2 | −10.7 | −0.9 |
| 6 | 66.4 | 34.4 | 69.6 | 52.3 | 86.8 | −11.9 | −6.3 |
| 7 | 49.5 | 19.7 | 49.2 | 12.4 | 75.6 | −17.7 | 36.9 |
| 8 | 68.2 | 37.1 | 71.0 | 49.3 | 87.5 | −11.0 | −4.9 |
| 9 | 10.6 | 24.9 | 13.4 | 49.1 | 43.3 | 27.6 | −64.2 |
| 10 | 42.1 | 31.8 | 41.2 | 41.9 | 70.3 | −6.6 | 22.4 |
| 11 | 76.5 | 56.6 | 78.0 | 48.8 | 90.8 | −5.7 | −1.3 |
| 12 | 46.2 | 31.8 | 45.8 | 36.2 | 73.4 | −8.0 | 18.0 |
| 13 | 72.9 | 47.7 | 74.3 | 33.7 | 89.1 | −8.2 | 2.5 |
| | All @ 4.0 mm thickness | | | | | | |
| 14 | 71.5 | 44.5 | 73.0 | 35.0 | 88.5 | −8.8 | 3.3 |
| 15 | 71.5 | 43.1 | 73.0 | 36.6 | 88.4 | −9.1 | 2.9 |
| 16 | 69.9 | 39.0 | 71.8 | 38.4 | 87.8 | −10.2 | 1.6 |
| 17 | 70.1 | 41.0 | 71.5 | 31.6 | 87.7 | −10.0 | 5.4 |
| 18 | 69.1 | 38.4 | 70.6 | 32.1 | 87.3 | −10.6 | 3.7 |
| 19 | 72.3 | 42.0 | 74.3 | 45.9 | 89.0 | −9.5 | 0.2 |
| 20 | 71.1 | 40.4 | 72.6 | 37.7 | 88.3 | −10.0 | 3.7 |
| 21 | 71.7 | 39.7 | 73.8 | 46.8 | 88.8 | −9.8 | −0.1 |
| 22 | 69.8 | 37.9 | 71.5 | 38.2 | 67.7 | −11.0 | 3.5 |

In accordance with the provisions of the patent statutes, the present invention has been described in what is considered to represent its preferred embodiment. However, it should be noted that the invention can be practiced otherwise than as described without departing from its spirit and scope.

I claim:

1. A batch glass composition comprising a soda-lime-silica glass batch mixture, at least one metal silicide as a performance modifying agent and, in addition, at least one iron-containing compound, said metal silicide being present in said glass batch mixture in an amount no greater than about 4.0 weight percent.

2. A batch glass composition as defined in claim 1, wherein said at least one metal silicide is selected from the group consisting of lithium silicide, sodium silicide, potassium silicide, rubidium silicide, cesium silicide, lanthanum silicide, magnesium silicide, calcium silicide, strontium silicide, barium silicide, cerium silicide, thorium silicide, scandium silicide, yttrium silicide, titanium silicide, vanadium silicide, chromium silicide, manganese silicide, iron silicide, cobalt silicide, nickel silicide, copper silicide, zirconium silicide, niobium silicide, molybdenum silicide, ruthenium silicide, rhodium silicide, palladium silicide, hafnium silicide, tantalum silicide, tungsten silicide, rhenium silicide, osmium silicide, iridium silicide, platinum silicide, praseodymium silicide, neodymium silicide, samarium silicide, europium silicide, gadolinium silicide, terbium silicide, dysprosium silicide, holmium silicide, erbium silicide, thulium silicide, ytterbium silicide, lutetium silicide, uranium silicide, neptunium silicide, plutonium silicide, and combinations thereof.

3. A batch glass composition as defined in claim 1, wherein said silicate glass includes over 25 mole % silica.

4. A batch glass composition as defined in claim 1, wherein said silicate batch glass mixture is a soda-lime-silica glass batch mixture.

5. A batch glass composition as defined in claim 1, wherein said batch glass mixture contains about 0.05 weight percent or more of a metal silicide.

6. A batch glass composition as defined in claim 4, wherein said batch glass mixture includes an amount of iron so as to result in a finished glass having a total iron content, measured as $Fe_2O_3$, of about 0.1 weight % to about 4.5 weight %.

7. A batch glass composition as defined in claim 1, wherein the batch glass composition includes one or more compounds selected from the group consisting of metal phosphides, metal borides, and metal nitrides.

8. A batch glass composition comprising:
   a) a soda-lime-silica float glass batch mixture including from about 65 to about 80 weight percent $SiO_2$, from about 10 to about 20 weight percent $Na_2O$, from about 5 to about 15 weight percent CaO, from about 0 to about 10 MgO, from about 0 to about 5 weight percent $Al_2O_3$, from about 0 to about 5 weight percent $K_2O$, from about 0 to about 5 weight percent BaO, from about 0 to about 5 weight percent $B_2O_3$, from about 0 to about 5 weight percent $Ga_2O_3$;
   b) an amount of at least one metal silicide; and
   c) an amount of at least one iron-containing compound separate from said metal silicide.

9. A batch glass composition as defined in claim 8, wherein said batch glass mixture includes an amount of an iron containing compound, or compounds, so as to result in a finished glass having a total iron content, measured as $Fe_2O_3$, of about 0.1 to about 4.5 weight percent.

10. A batch glass composition as defined in claim 8, wherein said metal silicide is included in the batch mixture in an amount greater than 0.05 weight percent.

11. A batch glass composition as defined in claim 8, wherein said metal silicide is selected from the group consisting of iron silicide, titanium silicide, and molybdenum silicide.

12. A finished silicate glass resulting from the admixing, heating and melting of at least one metal silicide in a silicate glass batch composition and at least one iron-containing compound which is separate from said metal silicide.

13. A finished silicate glass as recited in claim 12, wherein said silicate glass includes over 25 mole % silica.

14. A finished silicate glass as recited in claim 12, wherein said batch glass composition contains about 0.05 weight percent or more of a metal silicide.

15. A finished silicate glass composition as recited in claim 12, wherein said glass is a soda-lime-silica glass composition and said glass has a total iron content, measured as $Fe_2O_3$, of about 0.1 to about 4.5 weight percent.

16. A finished silicate glass composition as recited in claim 15, wherein said glass at a thickness in the range of 3 mm to 6 mm has an Illuminant A visible light transmittance of at least 70% and direct solar energy transmittance of less than 43%.

17. A laminated automotive glazing unit, comprising two sheets of a soda-lime-silica glass integrally adhered together, said glass including an amount of a silicide and resulting from the admixing, melting, and heating of at least one metal silicide in a batch glass composition.

18. An automotive glazing unit as recited in claim 17, wherein said soda-lime-silica glass includes about 0.1 to 4.5 weight percent $Fe_2O_3$ (total iron).

19. An automotive glazing unit as recited in claim 18, wherein said glazing unit has an Illuminant A visible light transmittance of greater than 70% and total solar energy transmittance of less than 43%.

20. An automotive glazing unit as recited in claim 18, wherein said glazing unit has an Illuminant A visible light transmittance of greater than 75% and total solar energy transmittance of less than 47%.

21. An automotive glazing unit as recited in claim 17, wherein each of said glass sheets has a thickness in the range of from about 1.7 mm to about 2.5 mm.

22. A method for producing a soda-lime-silica glass comprising admixing, heating, and melting a batch glass composition comprising from about 65 to about 80 weight percent $SiO_2$, from about 10 to about 20 weight percent $Na_2O$, from about 5 to about 15 weight percent CaO, from about 0 to about 10 MgO, from about 0 to about 5 weight percent $Al_2O_3$, from about 0 to about 5 weight percent $K_2O$, from about 0 to about 5 weight percent BaO, from about 0 to about 5 weight percent $B_2O_3$, from about 0 to about 5 wt % $Ga_2O_3$, an amount of one or more metal silicides and, in addition, at least one iron-containing compound, said metal silicide being present in said batch glass composition in an amount no greater than about 4.0 wt %.

23. A method as recited in claim 22, wherein said metal silicide is included in the batch mixture in an amount greater than 0.05 weight percent.

24. A method for melting a batch glass composition and producing a silicate finished glass, characterized by admixing, heating and melting a composition comprising:
  a) a silicate float glass batch mixture;
  b) a quantity of one or more metal silicides in an amount no greater than about 4.0 wt %; and
  c) an amount of at least one iron-containing compound separate from said metal silicide.

25. A method as recited in claim 21, wherein said melted silicate glass is cast onto a molten metal bath in a float glass process.

26. A method as recited in claim 25, wherein said float glass process operates at or above atmospheric pressure.

* * * * *